(12) United States Patent
Liu et al.

(10) Patent No.: US 12,011,683 B2
(45) Date of Patent: Jun. 18, 2024

(54) FILTER ELEMENT BUTT JOINT MECHANISM

(71) Applicant: Nanjing Hanshu Environmental Protection Equipment Co., Ltd., Nanjing (CN)

(72) Inventors: Guo Liu, Nanjing (CN); Xiaohan Liu, Nanjing (CN)

(73) Assignee: Nanjing Hanshu Environmental Protection Equipment Co., Ltd., Nanjing (CN)

( * ) Notice: Subject to any disclaimer, the term of this patent is extended or adjusted under 35 U.S.C. 154(b) by 0 days.

(21) Appl. No.: 18/408,337

(22) Filed: Jan. 9, 2024

(65) Prior Publication Data
US 2024/0149195 A1 May 9, 2024

Related U.S. Application Data

(63) Continuation of application No. PCT/CN2022/097027, filed on Jun. 3, 2022.

(30) Foreign Application Priority Data

Jul. 12, 2021 (CN) .......................... 202110786764.8

(51) Int. Cl.
*B01D 35/30* (2006.01)

(52) U.S. Cl.
CPC ...... *B01D 35/30* (2013.01); *B01D 2201/4053* (2013.01); *B01D 2201/4061* (2013.01); *B01D 2201/4069* (2013.01); *B01D 2201/4076* (2013.01)

(58) Field of Classification Search
CPC ............ B01D 35/30; B01D 2201/4053; B01D 2201/4061; B01D 2201/4069; B01D 2201/4076

USPC ....... 210/236, 232, 235, 222, 455, 453, 454, 210/445

See application file for complete search history.

(56) References Cited

U.S. PATENT DOCUMENTS

| 2013/0193054 A1 | 8/2013 | Beard et al. |
| 2021/0023485 A1* | 1/2021 | Pi ........................... B01D 29/15 |

FOREIGN PATENT DOCUMENTS

| CN | 107344037 A | 11/2017 |
| CN | 110354559 A | 10/2019 |
| CN | 111686500 A | 9/2020 |
| CN | 213492345 U | 6/2021 |

OTHER PUBLICATIONS

Internation Search Report of PCT/CN2022/097027, Mailed Aug. 30, 2022.

* cited by examiner

*Primary Examiner* — Madeline Gonzalez

(57) ABSTRACT

Disclosed is a filter element butt joint mechanism, including: a fixed base with a mounting cavity; a butt joint base arranged in the mounting cavity and close to an inner end of the fixed base; a filter element including a housing, a head of the housing being inserted into the mounting cavity from an outer end, an insertion pipe being formed at the head of the housing; a limit sliding-clamping mechanism; and a screw transmission mechanism, wherein a groove is formed in the head of the housing, and an insertion pipe is formed in the groove; a boss matched with the groove is formed on the butt joint base, and a plug-hole matching the insertion pipe is formed on the boss.

12 Claims, 9 Drawing Sheets

FILTER ELEMENT BUTT JOINT MECHANISM

CROSS-REFERENCE TO RELATED APPLICATIONS

This application is a continuation of International Patent Application No. PCT/CN2022/097027 with a filing date of Jun. 3, 2022, designating the United States, now pending, and further claims priority to Chinese Patent Application No. 202110786764. 8 with a filing date of Jul. 12, 2021. The content of the aforementioned applications, including any intervening amendments thereto, are incorporated herein by reference.

TECHNICAL FIELD

The present invention relates to the technical field of water purification, and in particular to a filter element butt joint mechanism.

BACKGROUND OF THE PRESENT INVENTION

A filter element in the prior art generally includes a columnar housing and a filter membrane core arranged in the housing; and a plurality of concentric separation rings are formed at the head of the housing, water gaps such as a raw water inlet, a concentrated water outlet, a purified water outlet, etc., are defined among the separation rings, and a screwing part is integrally formed at a tail portion of the housing. Each separation ring is sleeved with a sealing ring, and threads are formed in the head of the housing.

The filter element needs to be mounted on a main machine of a water purifier. Specifically, a columnar mounting cavity extending inwards is formed at a side portion of the main machine, a base is formed at the bottom of the mounting cavity, and the base is provided with a connector matched with the separation ring and can be in threaded connection with the head of the housing. A specific mounting process is as follows: the filter element extends into the bottom of the mounting cavity, so that the separation rings are inserted into the connector of the base; and at the same time, the screwing part at the tail portion of the housing is screwed to allow the housing to rotate, so that the housing is in threaded connection with the base, and the sealing ring plays a role in sealing the junction at the time.

However, in a process of mounting the filter element to the main machine, since the sealing ring generates a large resistance to the base during the insertion of the separation ring into the connector of the base, one hand is needed to apply an insertion force while applying a screwing force, and the other hand is needed to hold the main machine to prevent the movement of the main machine caused by the excessively large insertion force, so that the operation process is difficult, and the non-specialized personnel cannot finish the mounting sometimes.

SUMMARY OF PRESENT INVENTION

For the problems in the prior art, an embodiment of the present invention provides a filter element butt joint mechanism.

To solve the above technical problems, an embodiment of the present invention adopts the following technical solutions:

A filter element butt joint mechanism includes:
a fixed base with a columnar mounting cavity, the mounting cavity being provided with an inner end and an outer end;
a filter element including a housing, a head of the housing being inserted into the mounting cavity from the outer end, and an insertion pipe or a plug-hole being formed at the head of the housing;
a butt joint base arranged in the mounting cavity and close to the inner end of the fixed base, a plug-hole or an insertion pipe matching the insertion pipe or the plug-hole of the housing being formed on the butt joint base;
a limit sliding-clamping mechanism;
a screw transmission mechanism, wherein
a groove is formed at the head of the housing; a boss matched with the groove is formed on the butt joint base;
the limit sliding-clamping mechanism includes a limit lug formed on an inner wall of the fixed base and a lug groove formed in the housing, and the lug groove extends circumferentially with the bottom of the groove as a starting end so as to at least form a main body section located on a same plane;
the screw transmission mechanism includes a guide groove formed in an inner wall of the fixed base and a sliding part formed on the periphery of the butt joint base so as to slide along the guide groove, and a screw section is at least formed in the guide groove;
the limit lug stops the bottom of the groove to limit the housing, so that the groove and the boss form an initial butt joint state; by screwing the housing, the butt joint base rotates with the housing by means of the initial butt joint state, the limit lug slides into the main body section, and the butt joint base moves towards the housing by the sliding part sliding along the screw section, so that the insertion pipes are inserted into the plug-holes.

Preferably, the insertion pipes are formed in the groove of the housing; and the plug-holes are formed on the boss of the butt joint base.

Preferably, the guide groove also includes a mounting section arranged on the inner wall of the fixed base, the mounting section is connected to the starting end of the screw section, and the mounting section runs through a port of the inner end of the fixed base, so that the butt joint base is loaded onto the fixed base by the sliding part sliding along the mounting section.

Preferably, the guide groove also includes a horizontal section, and the horizontal section is connected to a tail end of the screw section for the sliding part to slide in;
an elastic cushion is formed on a plane outside the boss of the butt joint base, and when the sliding part slides into the horizontal section from the starting end of the screw section and passes through the tail end of the screw section, an end surface of the head of the housing compresses the elastic cushion.

Preferably, the lug groove also includes a sinking section, the sinking section is connected to the tail end of the main body section, and by screwing the housing, the limit lug slides into the sinking section.

Preferably, the sliding part includes an iron core, wherein a magnet is embedded in the inner wall of the fixed base, and the magnet is arranged on a position corresponding to the starting end of the screw section so as to form magnetic attraction to the iron core.

Preferably, the sliding part includes the columnar iron core and a roller sleeving the iron core, and the roller is used for sliding along the guide groove.

Preferably, the limit lugs include two that are located on a same plane and distributed in a circumferential direction, and the lug grooves include two corresponding to the limit lugs one by one;

the sliding parts include two that are located on a same plane and distributed in a circumferential direction, and the guide grooves include two corresponding to the sliding parts one by one.

Preferably, the groove radially runs through the housing;

a cross section of the groove is trapezoidal, and a width of the bottom of the groove is greater than the width of an opening of the groove.

Preferably, a plurality of reinforcing ribs that are distributed successively are formed on the wall of the groove.

Preferably, a capping is mounted in the port of the inner end of the fixed base;

the capping is used for pushing the butt joint base to a position where the sliding part is located at the starting end of the screw section;

a middle portion of the capping is hollowed.

Preferably, a plurality of insertion pipes are distributed successively along a through direction of the groove, and the plug-holes correspond to the insertion pipes one by one.

Compared with the prior art, the filter element butt joint mechanism disclosed by the present invention has the following beneficial effects:

1. In a process of mounting the filter element, the butt joint between the insertion pipes and the plug-holes can be realized only by screwing the housing, and there is no need to provide a large axial squeezing force (or an insertion force) while screwing, so that the filter element can be mounted with one hand, the main machine may not move, and the disassembling and installation are convenient and simple.
2. The elastic cushion is arranged on the end surface of the butt joint base, and the horizontal section is arranged at the tail end of the screw section, so that after the sliding part slides into the horizontal section, the elastic cushion is deformed under compression to generate a pre-tightening force between the housing and the butt joint base, and the sliding part can be effectively prevented from sliding back to the starting end of the screw section, thereby preventing repulsive force caused by the water pressure when in use from causing the movement of the butt joint base away from the housing, and even causing the separation of the insertion pipes from the plug-holes.
3. The sinking section is arranged at the tail end of the main body section of the lug groove, and the limit lug slides into the sinking section, so that the housing can be effectively prevented from rotating automatically in a reverse direction under the repulsive force caused by the water pressure, and causing the separation of the limit lug from the starting end of the main body section, thereby improving the mounting stability.
4. The magnet forming the magnetic attraction with the sliding part is arranged at the starting end of the screw section, so that a dragging action generated by a water pipe (a hose) connected to the tail portion of the butt joint base can be effectively prevented from causing the butt joint base not to be kept in the initial position.

It should be understood that the above general descriptions and the following detailed descriptions are only exemplary and illustrative, and do not limit the present invention.

The summary of various implementations or examples of the technology described in the present invention is not a comprehensive disclosure of a full scope or all features of the disclosed technology.

DESCRIPTION OF THE DRAWINGS

In the drawings that are not necessarily drawn to scale, same reference numerals may describe same components in different views. The same reference numerals with the same letter suffixes or different letter suffixes may indicate different examples of the same components. The accompanying drawings generally illustrate various embodiments in a way of examples rather than limitation, and explain the embodiments of the present invention together with the description and claims. The same reference numerals are used in all drawings to refer to the same or similar components at the proper time. The embodiments are illustrative and are not intended to be exhaustive or exclusive embodiments of the present apparatus or method.

Figure 1:
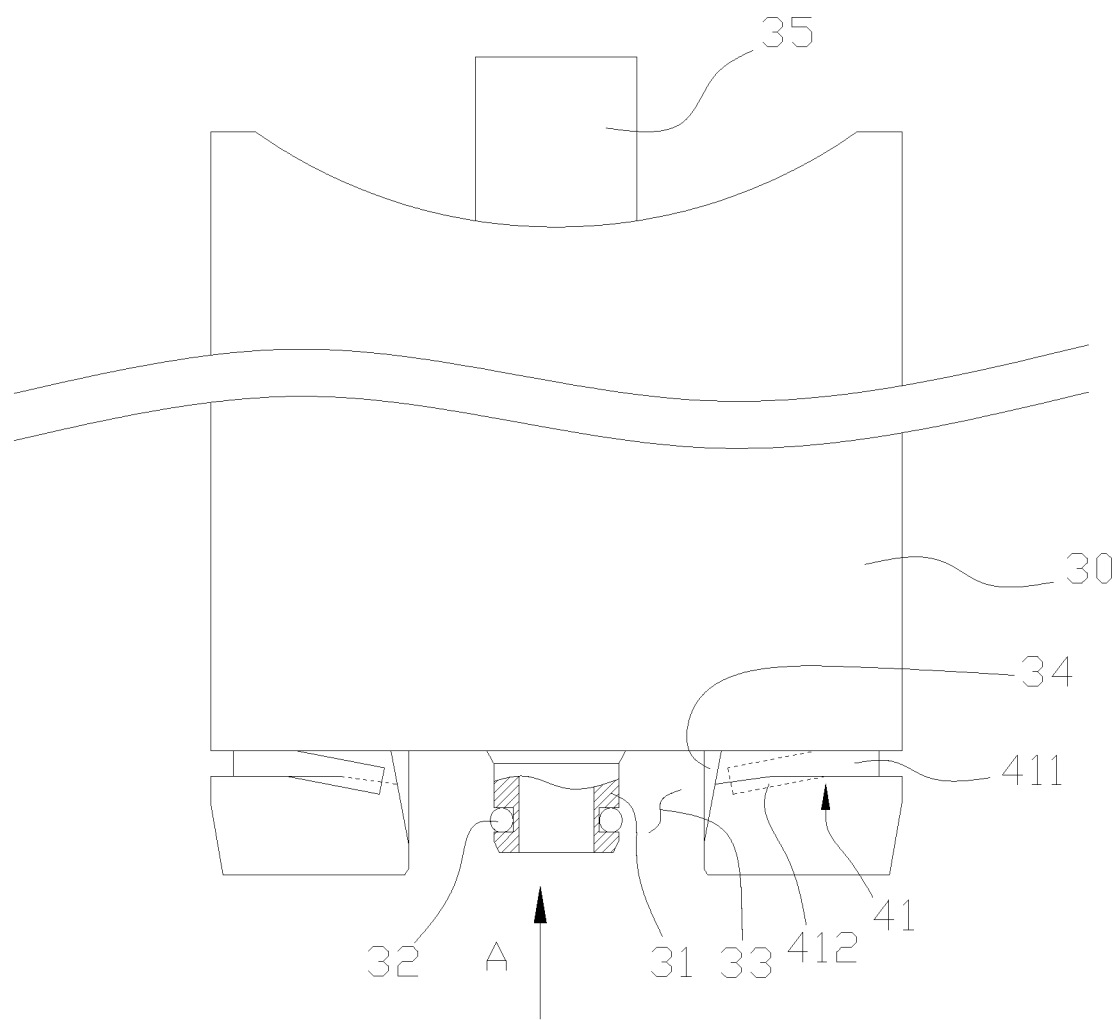
FIG. 1 is a front view of a filter element housing in a filter element butt joint mechanism provided in an embodiment of the present invention.

Description of reference numerals in the drawings: 10—Fixed base; 11—mounting cavity; 20—butt joint base; 21—plug-hole; 22—boss; 23—elastic cushion; 30—housing; 31—insertion pipe; 32—sealing ring; 33—groove; 34—reinforcing rib; 40—limit sliding-clamping mechanism; 41—lug groove; 411—main body section; 412—sinking section; 42—limit lug; 50—screw transmission mechanism; 51—guide groove; 511—screw section; 512—horizontal section; 513—mounting section; 52—sliding part; 53—magnet; 60—capping; 100—main machine.

DETAILED DESCRIPTION OF PREFERRED EMBODIMENTS

To make the purpose, technical solutions and advantages of embodiments of the present invention clearer, the technical solutions in the embodiments of the present invention are described clearly and completely below in combination with accompanying drawings in the embodiments of the present invention. Apparently, the described embodiments are some embodiments of the present invention, but not all embodiments. Based on the described embodiments of the present invention, all other embodiments obtained by those ordinary skilled in the art without creative effort fall within the protection scope of the present invention.

Unless otherwise defined, technical terms or scientific terms used in the present invention may have ordinary meanings as understood by the ordinary skilled in the field to which the present invention belongs. Terms "first", "second" and the like used in the present invention do not indicate any sequence, quantity or importance, but are only used to distinguish different components. The terms such as "include" or "contain" and other similar words mean that the elements or objects appearing before the word cover the elements or objects listed after the word and their equivalents, without excluding other elements or objects. The terms such as "connected" or "connecting" are not limited to physical or mechanical connection, but can include electrical connection, whether direct or indirect. The terms "upper", "lower", "left" and "right" are only used to indicate the relative positional relationship; and when the definite position of the described object changes, the relative positional relationship may also change accordingly.

In order to keep the following description of the embodiments of the present invention simple and clear, the detail description of known functions and known components may be omitted.

An embodiment of the present invention discloses a filter element butt joint mechanism. The filter element butt joint mechanism is used for mounting a filter element into a water purifier. The water purifier is provided with a main machine 100 for mounting the filter element butt joint mechanism.

As shown in FIG. 1 to FIG. 9, the filter element butt joint mechanism includes a filter element, a fixed base 10 and a butt joint base 20.

Figure 2:
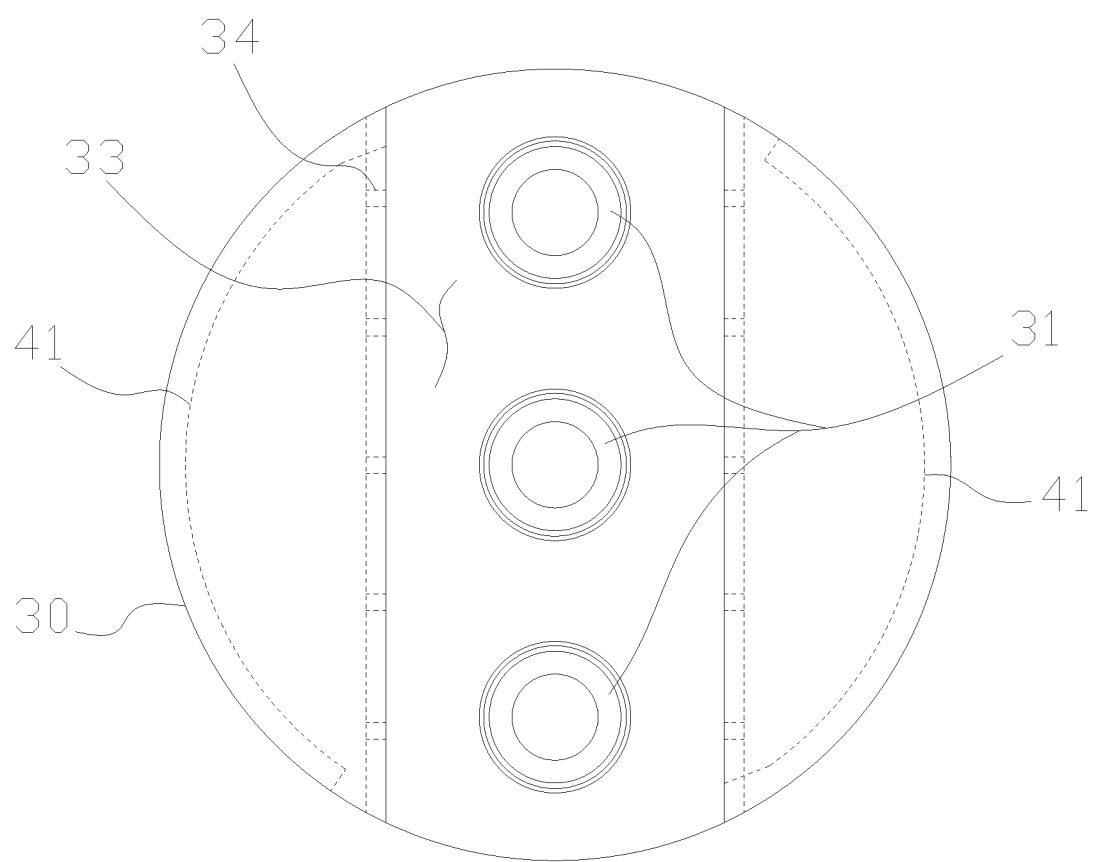
FIG. 2 is a view in an A direction of FIG. 1.

As shown in FIG. 1 and FIG. 2, the filter element includes a housing 30 generally in a columnar shape and a filter membrane core arranged in the housing 30, and the filter membrane core is used for filtering water. A screwing part is formed at a tail portion of the housing 30, and the screwing part may be a linear block that is integrally molded with the housing 30.

A groove 33 is formed in the head of the housing 30, and the groove 33 radially runs through the periphery of the housing 30; specifically, a cross section of the groove 33 is generally trapezoidal, a width of the bottom of the groove is greater than the width of an opening of the groove 33; reinforcing ribs 34 that are distributed successively along a through direction of the groove 33 are formed on the wall of the groove 33, and the reinforcing ribs 34 improve the structural strength of the groove 33.

A plurality of insertion pipes 31 are formed on the bottom of the groove 33, and the insertion pipes 31 are communicated with a cavity in the housing 30; specifically, the insertion pipes 31 include three, the three insertion pipes 31 are distributed at intervals successively along the through direction of the groove 33; and the three insertion pipes 31 may be used as a raw water inlet for supplying raw water to the filter element, a purified water outlet for outputting direct drinking water filtered by the filter membrane core, and a concentrated water outlet for discharging concentrated water generated by the filter membrane core.

Figure 3:
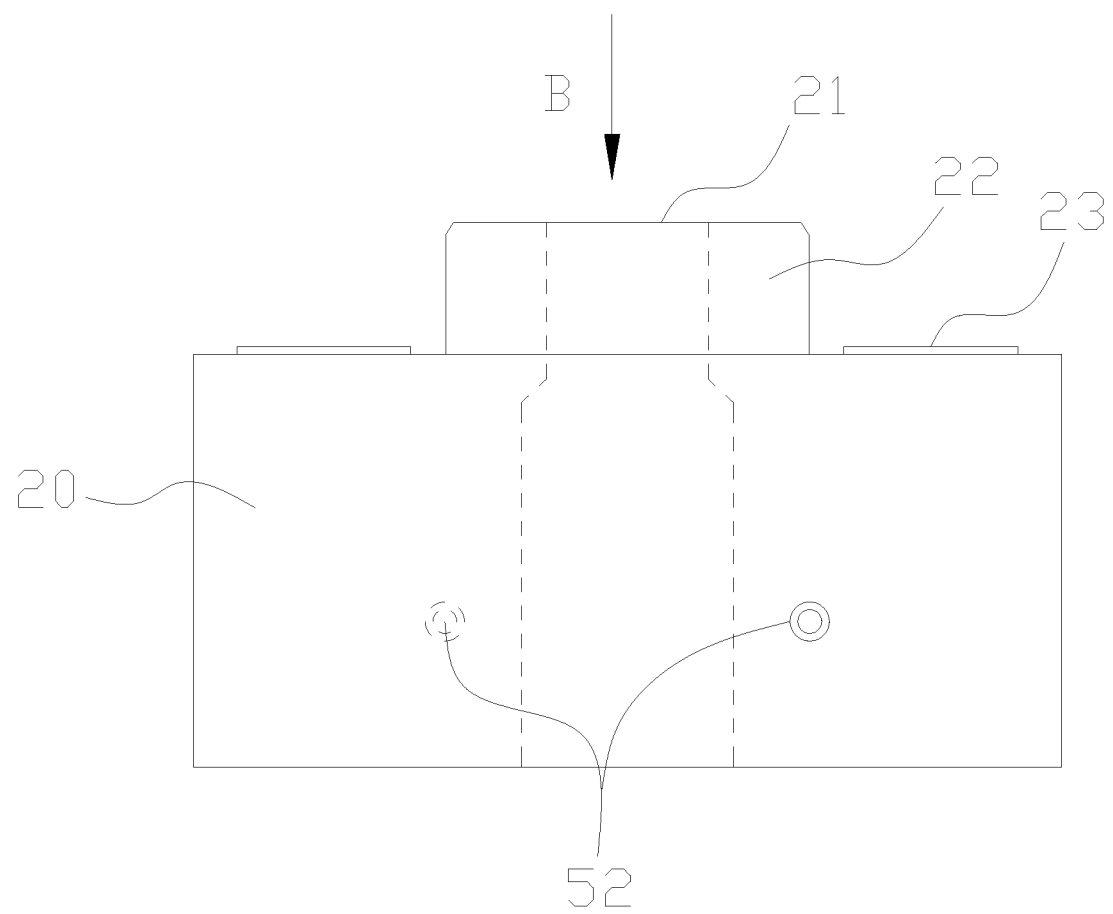
FIG. 3 is a front view of a butt joint base in the filter element butt joint mechanism provided in an embodiment of the present invention.
Figure 4:
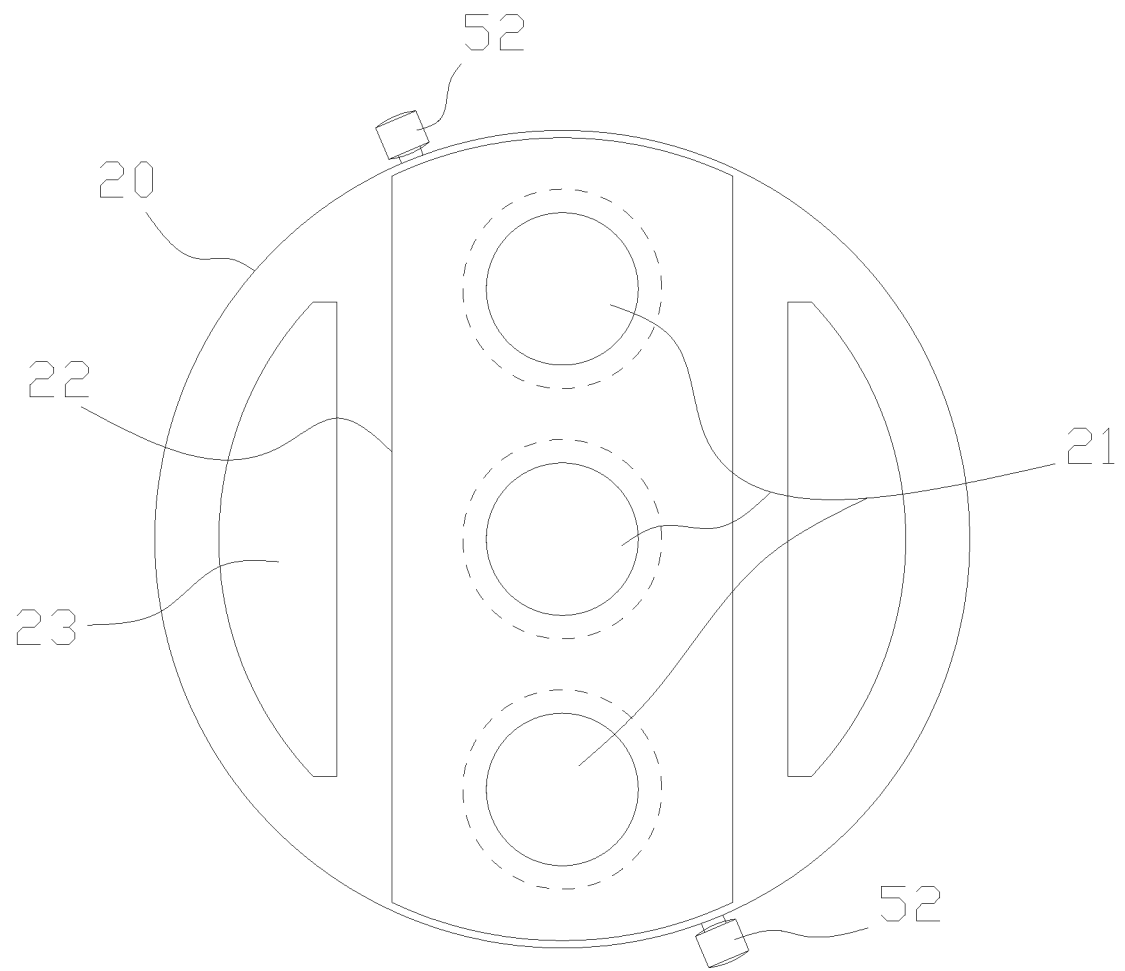
FIG. 4 is a view in a B direction of FIG. 3.
Figure 5:
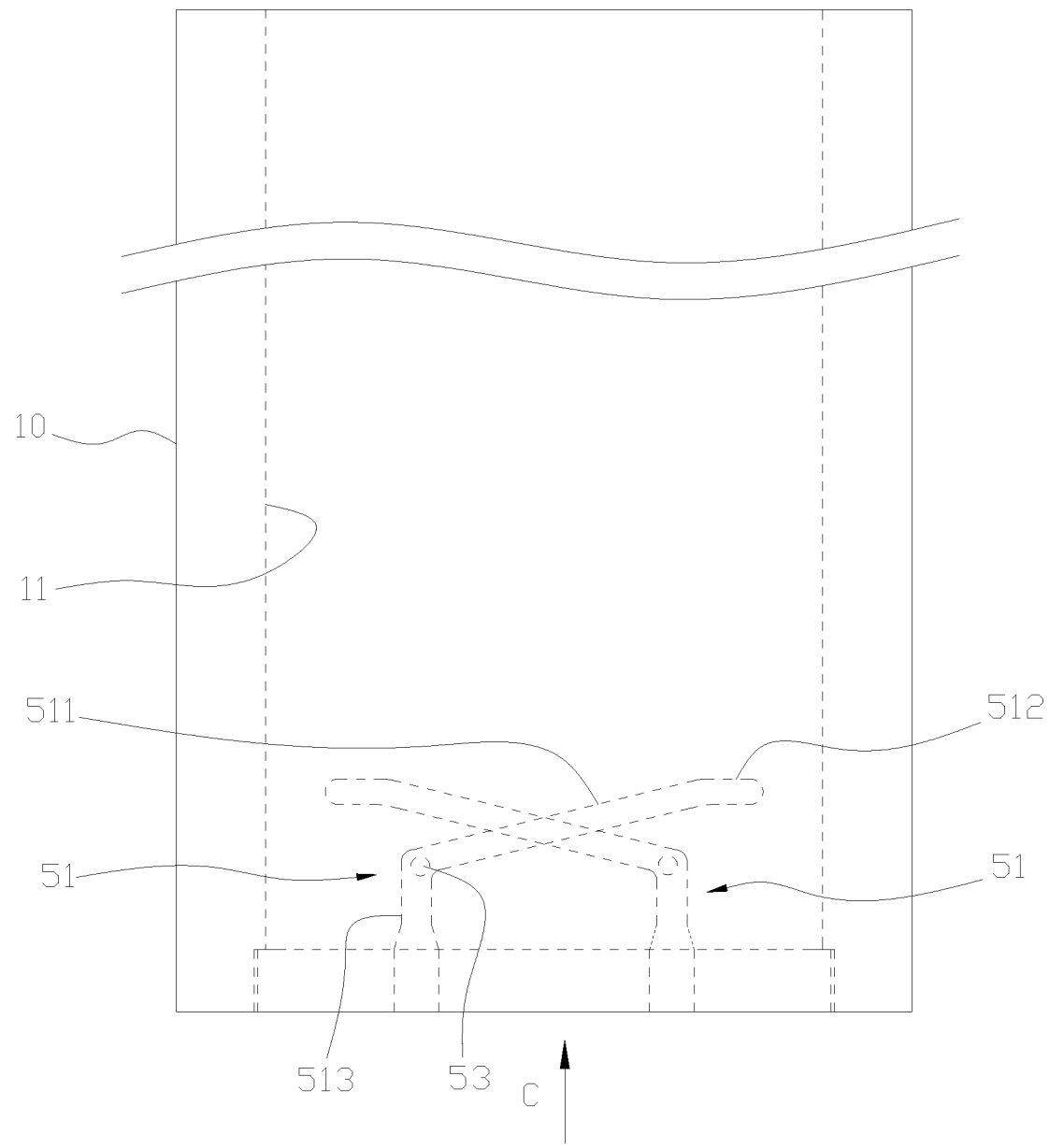
FIG. 5 is a front view of a fixed base in the filter element butt joint mechanism provided in an embodiment of the present invention.

As shown in FIG. 3 and FIG. 4, the butt joint base 20 is provided with a boss 22 matched with the groove 33 of the housing 30; plug-holes 21 for the insertion pipes 31 to insert are formed on the boss 22, and the plug-holes 21 axially run through the butt joint base 20; and the tail portion of each plug-hole 21 is connected with a water pipe, so that water is supplied to the filter element or discharged from the filter element through the connection of the plug-holes 21 and the insertion pipes 31. In order to form a sealed state after the insertion pipes 31 are inserted into the plug-holes 21, a sealing ring 32 is mounted on the periphery of the insertion pipe 31 close to the head. An elastic cushion 23 is arranged on a plane of the butt joint base 20 outside the boss 22, and the elastic cushion 23 may be arranged on the plane in an embedding way.

Figure 6:
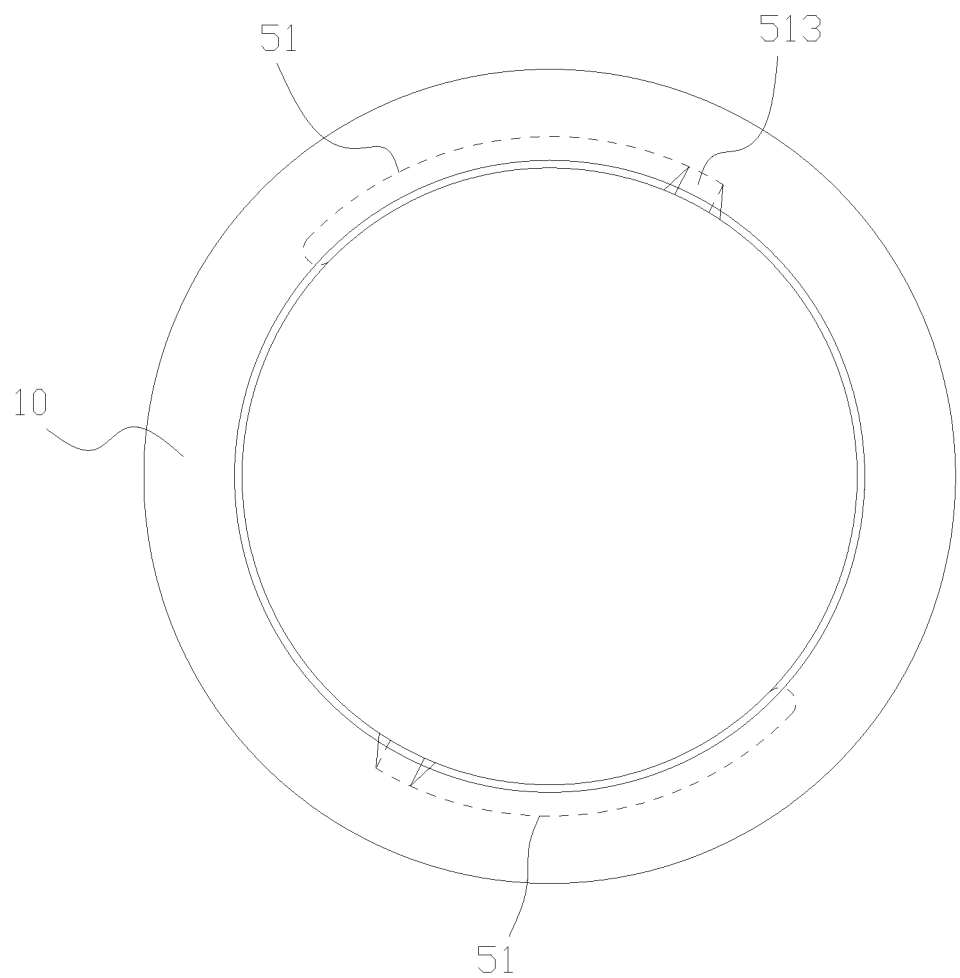
FIG. 6 is a view in a C direction of FIG. 5.

As shown in FIG. 4 and FIG. 6, the fixed base 10 is generally in a sleeve shape, that is, the fixed base 10 is provided with a columnar mounting cavity 11 running through in an axial direction, and the fixed base 10 is mounted in the main machine 100 of the water purifier; the mounting cavity 11 is provided with an outer end and an inner end with respect to a side portion and interior of the main machine 100; and it is easily understood that the outer end of the mounting cavity 11 is located at the side portion of the main machine 100, and the inner end of the mounting cavity 11 is located inside the main machine 100. The butt joint base 20 is arranged in the mounting cavity 11 and is close to the inner end of the mounting cavity 11, and the boss 22 of the butt joint base 20 faces the outer end of the mounting cavity 11; and the filter element is inserted into the mounting cavity 11 in a manner that the head faces the inner end of the mounting cavity 11, so that the insertion pipes 31 of the filter element are finally inserted into the plug-holes 21 of the butt joint base 20 to finish the installation of the filter element.

Figure 7:
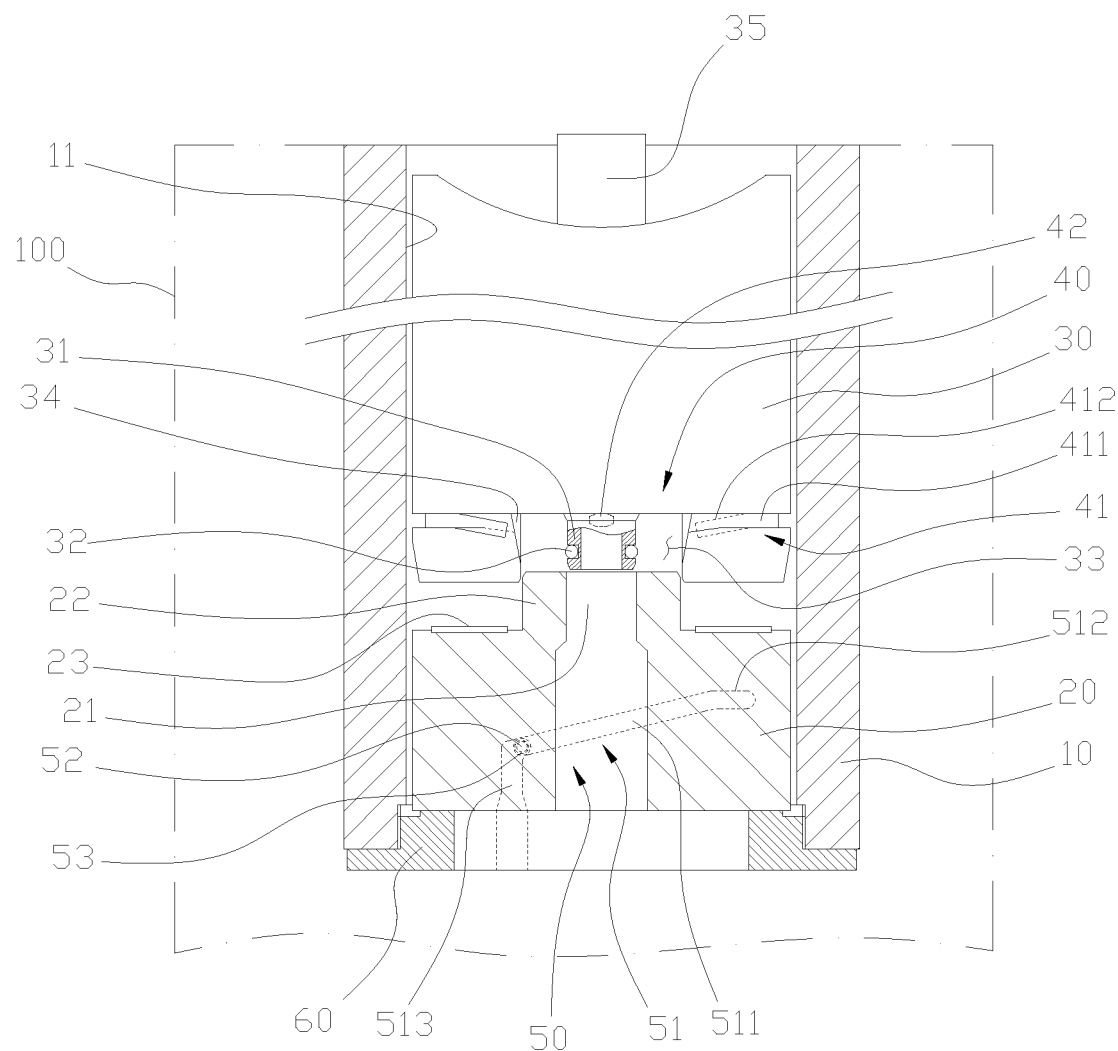
FIG. 7 is a view of the filter element butt joint mechanism in a first state provided in an embodiment of the present invention.
Figure 8:
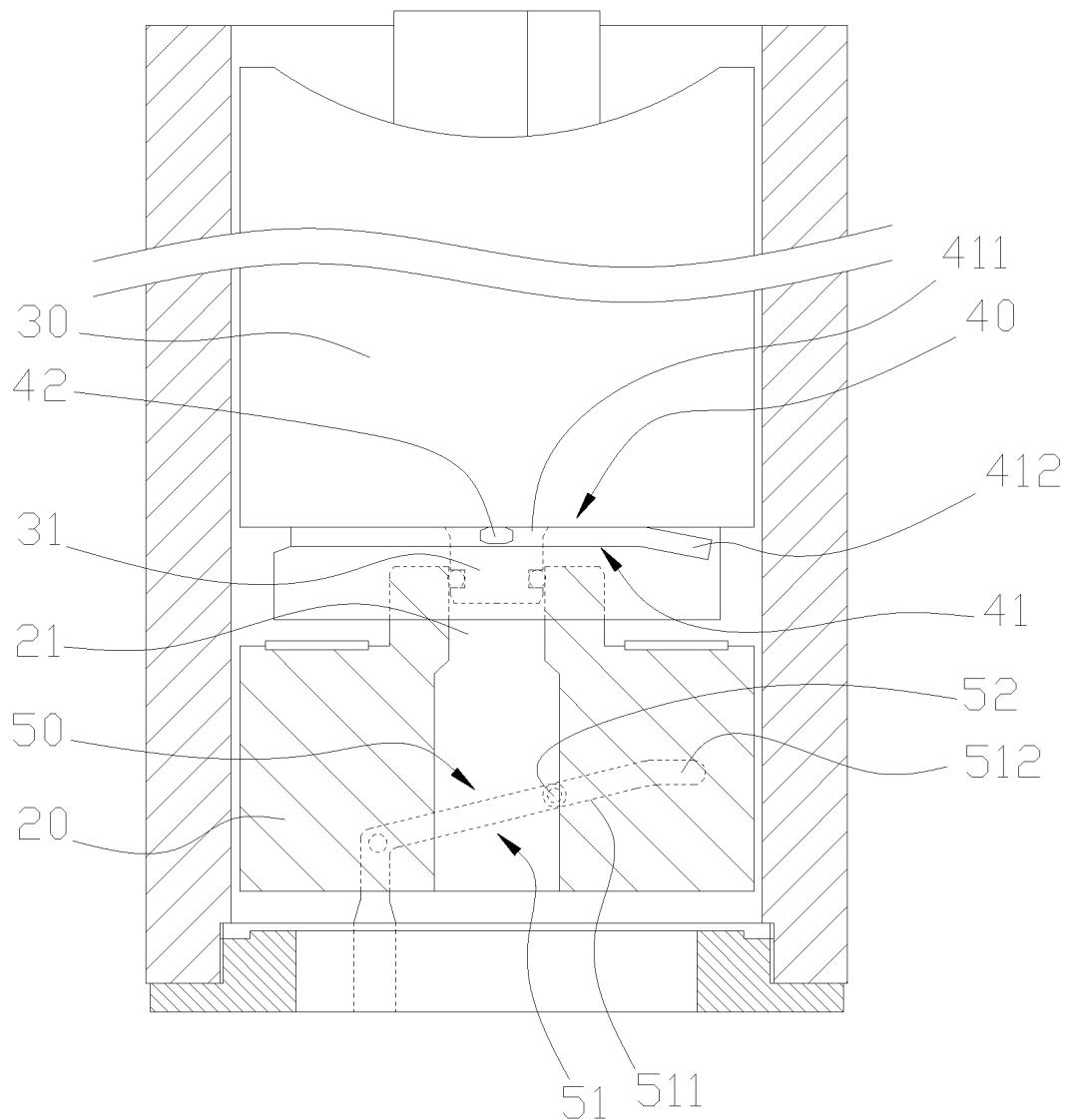
FIG. 8 is a view of the filter element butt joint mechanism in a second state provided in an embodiment of the present invention.
Figure 9:
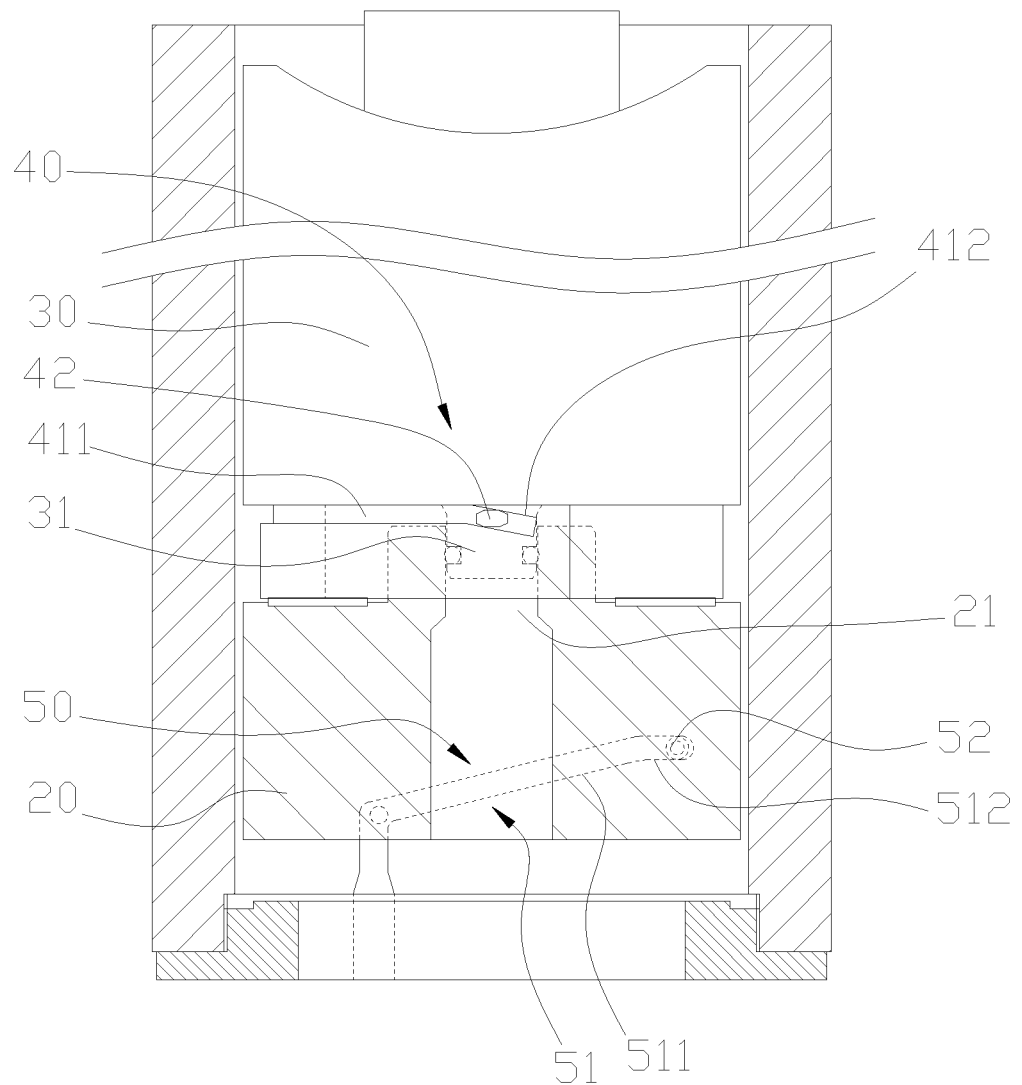
FIG. 9 is a view of the filter element butt joint mechanism in a third state provided in an embodiment of the present invention.

The limit sliding-clamping mechanism 40 is matched with the screw transmission mechanism 50 for inserting the insertion pipes 31 into the plug-holes 21, and the limit sliding-clamping mechanism 40 and the screw transmission mechanism 50 are constructed as follows:

As shown in FIG. 1 to FIG. 6, and in combination with FIG. 7 to FIG. 9, the limit sliding-clamping mechanism 40 includes a limit lug 42 and a lug groove 41; the limit lug 42 is formed on the inner wall of the fixed base 10, that is, the limit lug 42 is formed on the wall of the mounting cavity 11; the lug groove 41 is formed on the housing 30 of the filter element and is close to the head of the housing 30, the lug groove 41 extends circumferentially along the periphery of the housing 30 with the bottom of the groove 33 as a starting end, and the lug groove 41 forms a main body section 411 on a same plane from the starting end; and the tail end of the main body section 411 helically extends downwards to form a sinking section 412.

The screw transmission mechanism 50 includes a sliding part 52 and a guide groove 51; the sliding part 52 is arranged on the periphery of the butt joint base 20, the guide groove 51 is formed in the inner wall of the fixed base 10, that is, the guide groove 51 is formed in the wall of the mounting cavity 11; the guide groove 51 includes a mounting section 513, a screw section 511 and a horizontal section 512 that are connected successively; the mounting section 513 extends towards the inner end of the fixed base 10 so as to run through the port of the inner end of the fixed base 10; and a transitional junction between the screw section 511 and the mounting section 513 is used as the starting end of the screw section 511, the screw section 511 enables the guide groove 51 to spiral up, and the horizontal section 512 extends circumferentially only on the same plane.

The butt joint base 20 is loaded into the fixed base 10 by the sliding part 52 sliding into the mounting section 513 from the inner port of the fixed base 10, and a capping 60 is mounted at the inner port of the fixed base 10; and the capping 60 pushes the butt joint base 20, so that the sliding part 52 slides to a transitional area between the screw section 511 and the mounting section 513, i. e. sliding to the starting end of the screw section 511. The middle portion of the capping 60 is hollowed, so that a water pipe connected with the plug-hole 21 is led out from the capping 60.

The sliding part 52 specifically includes a columnar iron core and a roller sleeving the iron core, so that the sliding part 52 can slide more smoothly in the guide groove 51; and moreover, a columnar magnet 53 is embedded in the fixed base 10, the magnet 53 is arranged in an area corresponding to the starting end of the screw section 511, and the magnet 53 is used for forming magnetic attraction to the iron core in the sliding part 52, so that when the butt joint base 20 is in a free state, the sliding part 52 is located at the starting end of the screw section 511, and the butt joint base 20 is located in an initial position state then.

An operation process of mounting the filter element by using the above butt joint mechanism is described below:

Firstly, by holding the screwing part at the tail portion of the housing 30 with a hand, the head of the housing 30 (or the head of the filter element) is inserted into the mounting cavity 11 from the outer end of the mounting cavity 11 of the fixed base 10; and with the insertion of the housing 30, as shown in FIG. 7, the limit lug 42 on the inner wall of the fixed base 10 contacts the bottom of the groove 33 so as to stop the housing 30, and then the boss 22 of the butt joint base 20 in the initial position state partially extends into the port of the groove 33 at the head of the housing 30, so that the butt joint base 20 can rotate with the housing 30 by means of the cooperation between the boss 22 and the groove 33, and the insertion pipes 31 at the head of the housing 30 do not contact the plug-holes 21 on the boss 22.

Then, as shown in FIG. 8, the housing 30 is rotated by the screwing part of the housing 30, and in this process: on one hand, the housing 30 rotates relative to the fixed base 10, so that the limit lug 42 slides into the main body section 411 from the starting end of the main body section 411 of the lug groove 41; and on the other hand, the housing 30 drives the butt joint base 20 to be in a synchronous state, so that the sliding part 52 on the butt joint base 20 slides into the screw section 511 from the starting end of the screw section 511 of the guide groove 51, which enables the butt joint base 20 to move axially towards the housing 30 while rotating synchronously with the housing 30, and the sealing ring 32 is inserted into the plug-hole 21 with the insertion pipe 31. In the process, before the sliding part 52 slides to the tail end of the screw section 511, the plane of the head of the housing 30 contacts the elastic cushion 23 at two sides of the boss 22 of the butt joint base 20, so that when the sliding part 52 slides to the tail end of the screw section 511, the plane of the head of the housing 30 presses the elastic cushion 23 to cause the elastic deformation of the elastic cushion 23.

Then, as shown in FIG. 9, by continuously screwing the housing 30, the butt joint base 20 drives the sliding part 52 to slide into the horizontal section 512 of the guide groove 51, and then the limit lug 42 slides out from the tail end of the main body section 411 of the lug groove 41 and slides into the sinking section 412 of the lug groove 41, thereby finishing the installation of the filter element.

When the filter element needs to be disassembled, by screwing the housing 30 in a reverse direction, the sliding part 52 slides towards the starting end of the screw section 511, and the butt joint base 20 leaves the housing 30, so that the insertion pipes 31 are unplugged from the plug-holes 21; and meanwhile, the limit lug 42 is withdrawn from the starting end of the main body section 411 of the lug groove 41, and the limit lug 42 is separated from the lug groove 41, so that the filter element can be easily unplugged from the mounting cavity 11.

In some preferable solutions, the above limit sliding-clamping mechanisms 40 include two, and the two limit sliding-clamping mechanisms 40 are distributed circumferentially, so that the housing 30 rotates more stably and smoothly; and the screw transmission mechanisms 50 include two, and the two screw transmission mechanisms 50 are distributed circumferentially, so that the butt joint base 20 rotates more stably and smoothly.

The filter element butt joint mechanism provided by the present invention has the advantages as follows:

1. In a process of mounting the filter element, the butt joint between the insertion pipes 31 and the plug-holes 21 can be realized only by screwing the housing 30, and there is no need to provide a large axial squeezing force (or an insertion force) while screwing, so that the filter element can be mounted with one hand, the main machine 100 may not move, and the disassembling and installation are convenient and simple.
2. The elastic cushion 23 is arranged on the end surface of the butt joint base 20, and the horizontal section 512 is arranged at the tail end of the screw section 511, so that after the sliding part 52 slides into the horizontal section 512, the elastic cushion 23 is deformed under compression to generate a pre-tightening force between the housing 30 and the butt joint base 20, thereby effectively preventing the sliding part 52 from sliding back to the starting end of the screw section 511, preventing a repulsive force caused by water pressure when in use from causing the movement of the butt joint base 20 away from the housing 30, and even causing the separation of the insertion pipes 31 from the plug-holes 21.
3. The sinking section 412 is arranged at the tail end of the main body section 411 of the lug groove 41, and the limit lug 42 slides into the sinking section 412, so that the housing 30 can be effectively prevented from rotating automatically in a reverse direction under the repulsive force caused by the water pressure, and causing the separation of the limit lug 42 from the starting end of the main body section 411, thereby improving the mounting stability.
4. The magnet 53 forming the magnetic attraction with the sliding part 52 is arranged at the starting end of the screw section 511, so that a dragging action generated by a water pipe (a hose) connected to the tail portion of the butt joint base 20 can be effectively prevented from causing that the butt joint base 20 not to be kept in the initial position.

Furthermore, although exemplary embodiments have been described in the present invention, the scope of the present invention includes any and all embodiments based on the present invention with equivalent elements, modifications, omissions, combinations (e. g., solutions where various embodiments are combined), adaptations or changes. The elements in the claims are to be explained broadly based on the language adopted in the claims, and are not limited to the examples described in the description or during the implementation of the present application, and the examples are to be explained as non-exclusive. Therefore, the description and examples are intended to be considered as examples only, with a true scope and spirit specified by the following claims in combination with the full scope of equivalents.

The above descriptions are illustrative rather than limiting. For example, the examples (or one or more solutions) may be mutually combined to use. For example, other embodiments may be used by those skilled in the art upon reading the above description. Furthermore, in the above specific implementations, various features may be grouped to simplify the present invention. It should not be explained to be an intention that an unclaimed disclosed feature is essential to any claim. On the contrary, the subject of the present invention may be less than all features of a particular disclosed embodiment. Thus, the following claims incorporated into are the specific implementations herein as examples or embodiments, wherein each claim is independently used as a separate embodiment, and it is considered that these embodiments can be combined with each other in various combinations or permutations. The scope of the present invention should be determined with reference to the appended claims along with the full scope of equivalents to which these claims are entitled.

The above embodiments are only exemplary embodiments of the present invention, and are not used to limit the present invention. The protection scope of the present invention is determined by the appended claims. Those skilled in the art can make various modifications or equivalent substitutions within the spirit and protection scope of the present invention, and these modifications or equivalent substitutions should also be regarded as falling within the protection scope of the present invention.

We claim:

1. A filter element butt joint mechanism, comprising:
   a fixed base, the fixed base having a columnar mounting cavity, and the mounting cavity being provided with an inner end and an outer end;
   a filter element, the filter element comprising a housing; a head of the housing is inserted into the mounting cavity from the outer end, and an insertion pipe or a plug-hole is formed at the head of the housing;
   a butt joint base, the butt joint base being arranged in the mounting cavity and close to an inner end of the fixed base; a plug-hole or an insertion pipe matching the insertion pipe or the plug-hole of the housing is formed on the butt joint base;
   a limit sliding-clamping mechanism;
   a screw transmission mechanism;
   wherein a groove is defined in the head of the housing; a boss matched with the groove is formed on the butt joint base;
   the limit sliding-clamping mechanism comprises a limit lug formed on an inner wall of the fixed base and a lug groove formed on the housing, the lug groove extends circumferentially with a bottom of the groove as a starting end so as to at least form a main body section located on a same plane;
   the screw transmission mechanism comprises a guide groove formed in the inner wall of the fixed base and a sliding part formed on a periphery of the butt joint base so as to slide along the guide groove, and a screw section is at least formed in the guide groove;
   the limit lug stops the bottom of the groove to limit the housing, establishing an initial butt joint state between the groove and the boss; by screwing the housing, the butt joint base rotates with the housing by means of the initial butt joint state, causing the limit lug to slide into the main body section; and the butt joint base moves towards the housing along the screw section by means of sliding the sliding part, allowing the insertion pipe to be inserted into the plug-hole.

2. The filter element butt joint mechanism according to claim 1, wherein the insertion pipe is formed in the groove of the housing; and the plug-hole is formed on the boss of the butt joint base.

3. The filter element butt joint mechanism according to claim 2, wherein a plurality of insertion pipes are distributed successively along a through direction of the groove, and plug-holes correspond to the insertion pipes one by one.

4. The filter element butt joint mechanism according to claim 1, wherein the guide groove also comprises a mounting section arranged on the inner wall of the fixed base, the mounting section is connected to a starting end of the screw section, and the mounting section runs through a port of the inner end of the fixed base, so that the butt joint base is loaded onto the fixed base by the sliding part sliding along the mounting section.

5. The filter element butt joint mechanism according to claim 1, wherein the guide groove also comprises a horizontal section, and the horizontal section is connected to a tail end of the screw section for the sliding part to slide in;
   an elastic cushion is formed on a plane outside the boss of the butt joint base, and when the sliding part slides into a horizontal section from a starting end of the screw section and passes through a tail end of the screw section, an end surface of the head of the housing compresses the elastic cushion.

6. The filter element butt joint mechanism according to claim 5, wherein the lug groove also comprises a sinking section, the sinking section is connected to a tail end of the main body section, and by screwing the housing, the limit lug slides into the sinking section.

7. The filter element butt joint mechanism according to claim 5, wherein the sliding part comprises an iron core, wherein
   a magnet is embedded in the inner wall of the fixed base, and the magnet is arranged on a position corresponding to the starting end of the screw section so as to form a magnetic attraction to the iron core.

8. The filter element butt joint mechanism according to claim 7, wherein the sliding part comprises a columnar iron core and a roller sleeving the iron core, and the roller is used for sliding along the guide groove.

9. The filter element butt joint mechanism according to claim 1, wherein
   two limit lugs are located on a same plane and distributed in a circumferential direction, and two lug grooves corresponding to the limit lugs one by one;
   two sliding parts are located on a same plane and distributed in a circumferential direction, and two guide grooves corresponding to the sliding parts one by one.

10. The filter element butt joint mechanism according to claim 1, wherein
    the groove radially runs through the housing;
    a cross section of the groove is a trapezoidal, and a width of the bottom of the groove is greater than a width of an opening of the groove.

11. The filter element butt joint mechanism according to claim 10, wherein a plurality of reinforcing ribs which are distributed successively are formed on a wall of the groove.

12. The filter element butt joint mechanism according to claim 1, wherein a capping is mounted in a port of the inner end of the fixed base;
    the capping is used for pushing the butt joint base to a position where the sliding part is located at a starting end of the screw section;
    a middle portion of the capping is hollowed.

* * * * *